Patented June 23, 1953

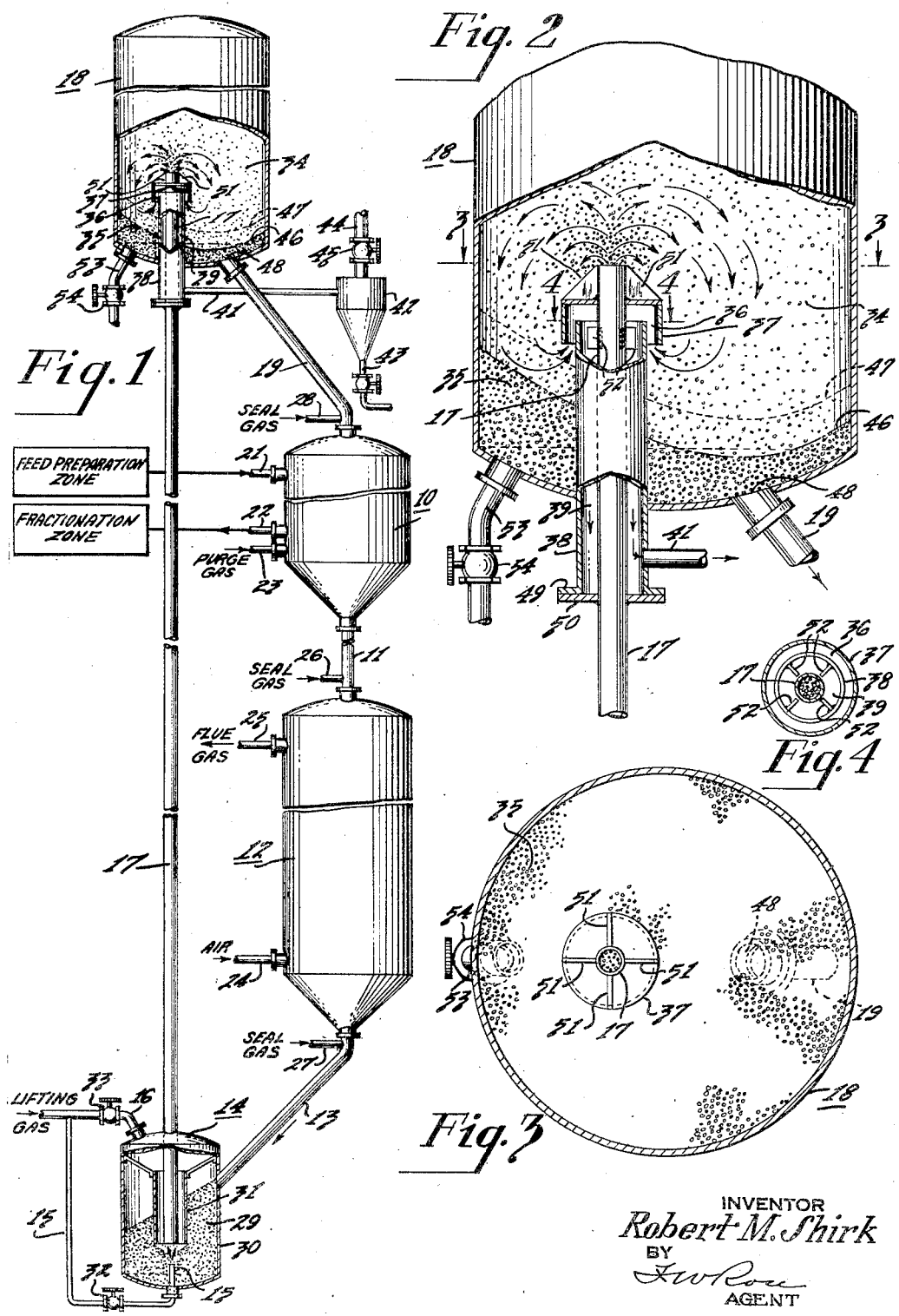

2,643,161

UNITED STATES PATENT OFFICE 2,643,161

ART OF DISENGAGEMENT OF GASES FROM FLUENT SOLID PARTICLES

Robert M. Shirk, Lindamere, Wilmington, Del., assignor to Houdry Process Corporation, Philadelphia, Pa., a corporation of Delaware Application April 13, 1949, Serial No. 87,232

3 Claims. (Cl. 302—66)

This invention relates to processes involving the contact of process fluids or gases with solids, as, for example, the conversion of hydrocarbons by contact with solid catalysts.

In order to realize the advantages of continuous operation, the solids employed in such processes are frequently prepared in such a form or are handled in such a manner as to be fluent or capable of flowing so that they can be moved or flowed in a continuous manner through a plurality of process zones in each of which zones the solids successively contact process gas or vapor. When solids are in the form of relatively small particles such as particles between 100 and 400 mesh, they are handled by techniques known as fluidization and light phase suspension whereas, when the solids are in the form of relatively large particles or granules, such as particles ranging in size between 0.5 and 0.05 of an inch, a technique using downwardly moving non-turbulent or compact beds of particles has been successful.

The present invention involves the latter technique of flowing relatively large particles or granules, such as sized particles, pellets, formed spheres and the like of the size referred to above, downwardly in non-turbulent flow principally or solely by the influence of gravity. The gravitational flow of solids through process zones as downwardly moving non-turbulent beds is discussed generally in "The 'T. C. C.' Cracking Process for Motor Gasoline Production" by R. H. Newton, G. S. Dunham and T. P. Simpson, "Transactions of the American Institute of Chemical Engineers," volume 41, page 215, April 25, 1945, and the articles there cited. It is there noted that such solids flow through pipes, orifices or openings at maximum rates determined by the size of such pipes, openings or orifices; such maximum rates of discharge being virtually independent of the height of the column of solids thereabove. This basic property of such systems sharply differentiates this technique from the fluidized technique, since in the latter instance the flow through the pipe, orifice or opening (as, for example, a valve) is directly proportional to the hydrostatic pressure of a fluidized solids-gas phase above such opening at otherwise identical conditions, the hydrostatic pressure being determined by the height of the fluidized column thereabove and the density of the solids-gas phase.

It has been found advantageous to transport a fluent particulate solid comprising relatively large particles of a size such that they are capable of downward flow in bed form due principally or solely to the action of gravity by a gas lift of the type described herein in order to effect circulation of such particles through a system comprising the gas lift and one or more reaction or process zones in which said solid contacts a reactive or process gas as a downwardly moving non-turbulent bed.

When the system comprises a plurality of reaction or process zones, such as a hydrocarbon conversion system of the type described more fully below, these process zones are preferably, but not necessarily, at different heights so that the solid particles need be transported by the gas lift only once in a complete cycle of operation. In such systems, the solid particles, after disengagement from the transporting gas, are thereafter preferably moved downwardly in continuous downwardly moving non-turbulent flow so that the rate of transportation and circulation through the system is easily controlled using the gas lift of the particular type described. The overall operation of the process, insofar as it is controlled by the rate of circulation of the solid, is thereby subject to smooth and immediate change or control and the rate of circulation is readily maintained within desired limits. An exemplary system of this type has been described in an article entitled "Houdriflow: New Design in Catalytic Cracking," appearing, inter alia, in the "Oil and Gas Journal," page 78, January 13, 1949.

In such systems, the lifting gas is disengaged from the solid particles prior to their recirculation through the system. It has been found that the use of previously proposed methods and apparatus for the disengagement of such particles from a lifting gas causes undesirably high rates of attrition of the solid particles or involves undesirably wide or tall disengaging vessels. The methods and apparatus described in connection with the present invention solve the problem of disengaging solid particles from a suspension of such particles in a lifting gas without causing the high rates of attrition and using compact and efficient equipment.

In accordance with the present invention, it has been found that solid particles can be disengaged from a lifting gas by discharging a suspension of the type herein described, from the upper end of the lifting zone into a disengaging zone surrounding said upper end, the disengaging zone being a confined zone of considerably greater horizontal cross sectional area than the lifting zone (as described more fully below) and extending from above the upper end of the lifting zone to below said upper end, reversing the flow of said suspension, accumulating the solid particles as a compact bed whose surface is substantially below the upper end of the lifting zone and removing lifting gas from which solid particles have been disengaged from said disengaging zone at a location vertically between the surface of said bed and the upper end of said lifting zone.

The principles involved in the present invention are set forth in detail below in connection with the description of the drawings in which a preferred embodiment of the present invention is shown in a schematic manner. Although the present invention includes within its scope a variety of processes as set forth below, the drawings will be explained in terms of a catalytic hydrocarbon cracking process in which the reaction zones comprise a hydrocarbon conversion zone and a catalyst regeneration zone, since those skilled in the art will understand thereby how to operate analogous or equivalent processes by the same principles.

In the drawings:

Figure 1 is a schematic representation of the major parts of a system embodying the present invention with parts broken away to reveal the internal construction of some of the vessels.

Figure 2 is an enlarged view of the disengaging zone or separator vessel in Figure 1.

Figure 3 is a transverse section of the vessel shown in Figure 2 taken along the lines 3—3 in Figure 2.

Figure 4 is a sectional view of the top of the gas lift taken along the lines 4—4 in Figure 2.

As illustrated in Figure 1, relatively large particles of solid cracking catalyst, such as particles between 0.05 and 0.5 inch, and preferably about 2 to 6 millimeters in diameter flow downwardly through a convertor vessel or reactor indicated generally at 10 as a downwardly moving non-turbulent bed, and are transferred by a conduit 11 to a regenerator vessel or kiln indicated generally at 12 in which coke deposited on the catalyst particles in the cracking zone is removed. Catalyst particles are withdrawn from regenerator 12 by a conduit 13, flow downwardly therein as a compact non-turbulent column to the bottom of a gas lift indicated generally at 14 and are moved or lifted vertically upward as a relatively dense continuous stream of solid particles by a transporting or lifting gas introduced to the gas lift by conduits 15 and 16, the particles of catalyst passing upwardly through an elongated vertical cylindrical passageway or conduit 17 to a closed housing, vessel or separator indicated generally at 18 which vessel comprises a disengaging zone. Solid catalyst particles disengaged from the transporting or lifting gas flow from vessel 18 to the reactor through conduit 19 as a relatively compact non-turbulent column of particles.

Hydrocarbon fractions to be cracked, ranging from naphthas to heavy residual stocks, are introduced from a feed preparation zone of a type known to the art through conduit 21 in vapor, liquid or mixed phase condition to reactor 10 and contacted by the catalyst particles therein, using known methods and apparatus. The hydrocarbons are passed downwardly through the bed of catalyst in reactor 10 under conversion conditions, disengaged from the catalyst particles, removed from the reactor through conduit 22 and thereafter directed to a fractionation zone, as shown, for appropriate processing to products such as catalytically cracked gasoline, fuel oil, recycle stock and the like. A purge gas such as steam, spent flue gas and the like is introduced to reactor 10 by conduit 23 to purge the catalyst particles of volatile hydrocarbons. The catalyst particles, as a result of their contact with the hydrocarbons in the reactor, concomitantly accumulate a deposit of coke which is removed in kiln 12 by introducing air through conduit 24 and passing it upwardly through the downwardly moving catalyst and removing the flue gas formed by combustion of the coke through conduit 25. Kiln 12 may contain a single zone or a multiplicity of zones, as is understood by the art. In order to keep separate the gases in reactor 10 and kiln 12, a seal gas is introduced to conduit 11 by conduit 26. Similar provisions for introducing seal gases to conduits 13 and 19 are provided by conduits 27 and 28, respectively. The compositions effective as hydrocarbon conversion and/or cracking catalysts (typically natural or synthetic aluminosilicates) and the conditions in reactor 10 and kiln 12 are well known to the art and need not be repeated here.

As shown in Figure 1, the catalyst particles from conduit 13 form a compact body 29 in the vessel 30 at the bottom of conduit 17 which conduit serves as a gas lift for the particles. A portion of the total transporting or lifting gas, which may be hydrocarbons, flue gas, such as flue gas from kiln 12, or oxygen containing gas, may be introduced to the top of vessel 30 by conduit 16, and pass downwardly in the annulus between open ended conduit 31 and conduit 17. Another portion of the gas may be introduced as an upwardly directed stream within the lateral extent and substantially below the top of body 29 by conduit 15. The relative amounts of gas added by conduits 15 and 16 are controlled by valves 32 and 33, respectively, which valves thereby afford one means of controlling the rate of flow of catalyst particles. The transporting gas imparts an upward velocity to catalyst particles within body 29 and thus moves particles from body 29 upwardly through conduit 17 as a relatively dense continuous stream of particles as described more fully below. The lower end of passageway or conduit 17 is of considerably smaller lateral extent than body 29 and is spaced below the top of said body.

The gas lift described herein has been found to operate at a high efficiency and an economically low rate of particle attrition when the maximum average velocity of travel of the catalyst particles is advantageously above about 10 and below about 60 feet per second, and preferably between about 20 to 40 feet per second. (The average velocity is the velocity of all of the particles averaged over the horizontal cross sectional area of the lift pipe; the maximum velocity is the velocity after final acceleration; the particles generally emerging from the top of the lift at the maximum velocity.)

In accordance with the present invention, the relatively dense stream of catalyst particles, which moves upwardly in conduit 17 as a suspension of such particles in the lifting or transporting gas, is directed to housing 18, which housing comprises a disengaging zone or chamber 34. Disengaging chamber or zone 34 extends from above the upper end of conduit 17 to below said end and is of considerably greater horizontal cross sectional area than conduit or passageway 17 and has a horizontal cross sectional area such that the velocity of the lifting gas is insufficient to support the solid particles after emergence from conduit 17. The top of housing 18 is preferably sufficiently above the end of conduit 17, that particles emerging from the conduit do not strike the top with sufficient force to break the particles. The gas lift may be positioned slightly eccentrically in respect to the horizontal extent of disengaging zone 34 as shown in Figs. 1, 2 and 3 or it may, particularly in large vessels, be positioned substantially in the center so as to be equidistant from the walls of the housing 18.

As shown in Figure 2, the suspension, after emerging from the upper end of conduit 17, travels outwardly and then downwardly in zone or chamber 34 (i. e., the flow of the suspension is reversed). The solid particles, no longer supported by the lifting gas, fall downwardly and accumulate as a compact bed 35 in the bottom of the housing 18. The lifting gas, substantially free of solid particles, flows upwardly to and through annulus 36, which annulus is formed by baffle or cap 37 and conduit 38, the lifting gas thus having undergone a 360° change in direction. The lifting gas then again reverses direction and travels downwardly in the annular passageway 39, which passageway lies between conduit 38 and conduit 17, and then by conduit 41 to a location outside the disengaging zone, such as to a cyclone separator 42 for the removal of any fine particles which may not have been disengaged in zone 34. Fine particles removed in cyclone separator 42 are withdrawn through conduit 43, while gas free of fines passes overhead through conduit 44. Valve 45 in conduit 44 may be a pressure control valve when it is desired to maintain the pressure in the disengaging zone above atmospheric.

As can be seen from Figures 1 and 2, the suspension emerging from conduit 17 travels in a path such that the solid particles are disengaged from the lifting gas in a simple manner without the use of complicated apparatus. In operation, solid particles from bed 35 are removed at a rate such that the upper surface of bed 35, which surface is indicated in Figure 3 approximately by line 46, remains below the locus of removal of the gas from which solid particles have been disengaged (i. e., below the bottom of baffle 37). Housing 18 is preferably sized so that the level may vary such as rising to dotted line 47 without interfering with the disengagement of the lifting gas and solid particles. In general, the entire system is filled with the proper amount of catalyst particles and will therefore continue to operate without too great a rise in the surface of bed 35, the particles discharging through outlet 48 and conduit 19 and passing through the rest of the system at the same rate at which they are introduced to the disengaging zone.

As can be seen from the drawings, the present invention employs advantageously simple apparatus for the essential operation of disengaging the solid particles from the lifting gas, much of this simplicity resulting from the cooperation of the various parts as will be evident from the following detailed description thereof.

Conduit 38, which is preferably a cylindrical pipe or conduit of greater diameter than conduit 17, which is also preferably cylindrical (both conduits 38 and 17 hence having a circular horizontal cross section), extends downwardly from near but below the top of conduit 17 to outside the disengaging zone 34 and housing 18. Conduit 38 is closed at the bottom by an annularly shaped flange 49, to which conduit 38 is affixed as by welding. Flange 49 rests on a plate 50, which is affixed to conduit 17 as by welding, flange 49 and plate 50 being bolted or welded together. Alternatively, the bottom of conduit 38 may be closed by an expansion joint or a slip joint affixed to both conduits 17 and 38. Baffle 37 is placed above the top of conduit 38 and at or below the top of conduit 17 and is spaced a relatively small distance from conduit 38. Baffle 37 extends, as is shown in the drawings, outwardly horizontally beyond conduit 38 and then vertically downwardly to a level slightly below the top of conduit 38, the bottom of the rim of baffle 37 being at a locus beyond and below the top of conduit 38. Baffle 37 is affixed to conduit 17, as by welding. Fins 51, which are welded to both baffle 37 and conduit 17, give added support and stiffness to baffle 37. Spacers 52, which are welded to conduit 38 but not to conduit 17, so that the latter conduit is free to move independently of the former, space apart and maintain in their relative positions conduits 38 and 17 without interfering with the passage of gas.

Conduit 38 and conduit 17 (and to some extent, baffle 37) thus comprise a gas withdrawal means for withdrawing gas, from which solid particles have been disengaged, from the disengaging zone at a locus (annulus 36 and the top of conduit 38) contiguous to the periphery of the lifting zone and near the top thereof. Baffle 37, which may have various shapes, such as an upwardly frusto-conical shape, prevents any solid particles from falling down passageway 39 from above and also causes the gas to advantageously take a tortuous path on its way out of the disengaging zone.

As noted above, the bed level in zone 34 is maintained a safe distance below annulus 36 by continuously withdrawing solid particles through a particle withdrawal means such as conduit 19. Should flow through conduit 19 cease or be insufficient to maintain the bed at the proper level, particles are withdrawn through an auxiliary particle withdrawal means, such as conduit 53, by opening valve 54. Particles so withdrawn are directed to a storage vessel or appropriately by-passed around one or more process zones.

From the above description, it is apparent that the present invention advantageously provides methods and apparatus for disengaging lifting gas from solid particles without impact against metallic surfaces and hence without excessive attrition of the solid particles while using relatively small and efficient equipment. Among the reasons for increased efficiency and low attrition may be noted the following.

When, in accordance with the present invention, the bed level is maintained below the bottom of cap 37 (the locus at which the disengaged gas leaves the disengaging zone proper), the apparatus provides a zone for the separation of the solid particles and lifting gas in which the velocity of the gas is insufficient to support or lift the particles. This is desirable since, should the bed level rise to the lowermost portion of cap 37 where the gas is passing through a relatively small area and hence has high velocity, lifting of the particles with consequent entrainment would occur.

It therefore is apparent that the method of the present invention avoids entrainment of the solid particles (such as that above described) by passing the suspension from the lifting zone (where the horizontal cross sectional area is relatively small and hence the velocity of the lifting gas is high) to a zone of relatively large cross sectional area where the lifting gas and solid particles are disengaged, and then withdrawing gas, from which the particles have been disengaged, from the disengaging zone in a zone of relatively small cross sectional area.

Moreover, flexibility of operation is assured since a considerable variation of the velocity of the suspension emerging from the gas lift does not affect the operation of the disengaging zone herein described. Again, by providing a sufficient distance from cap 37 to the bottom of housing 18 and using a bed level substantially below cap 37 (e. g., operation at bed level 46), surges and sudden changes in the gas lift which causes differences in the amount of solid particles disengaged do not upset the operation of the separator. Attrition of the particles is low or negligible since the disengaging zone is preferably sized and shaped so that the particles do not impinge on the top or walls with consequent fracture or abrasion. All of these advantages are gained with simple and inexpensive equipment operated as described herein.

Obviously many modifications and variations of the invention as hereinbefore set forth may be made without departing from the spirit and scope thereof (as, for example, where the system involves several gas lifts). Therefore only such limitations should be imposed on the invention as are indicated in the appended claims.

I claim as my invention:

1. In the process of circulating fluent solid granular particles wherein such particles are elevated by a lift gas through an upright confined lift path and discharged into a disengaging zone considerably wider than said path, the method which comprises maintaining a supported layer of solid particles at the bottom of the disengaging zone by continuously withdrawing particles from the bottom of said layer while continuously supplying discharged particles disengaged from gas to the surface of said layer by permitting such particles to fall freely from an attained height to such surface, controlling the rate of withdrawal to maintain such surface at a level below that of discharge of the solid particles from the lift path into the disengaging zone, and withdrawing lift gas from said disengaging zone at a level between said surface and said discharge level.

2. The method in accordance with claim 1 wherein the lift gas is withdrawn as an annular stream adjacent to and surrounding said lift path.

3. In a system wherein fluent solid particles continuously pass through at least one process zone as a compact downwardly moving nonturbulent bed, the method which comprises elevating said particles as a suspension in a lifting gas through a straight vertical path, the end of said path being above a process zone in said system, discharging said suspension from the upper end of said path into a disengaging zone surrounding said end, said disengaging zone being a confined zone of considerably greater horizontal cross-sectional area than said path and extending unobstructedly from above the upper end of said path to a level below said end defined by the uppermost surface of a compact bed of such solid particles, reversing the flow of said suspension by removing from said disengaging zone lifting gas from which solid particles have been disengaged, said removal being effected at a location between said surface and the upper end of said path, accumulating disengaged solid particles to form such compact bed by interrupting free fall of disengaged solid particles by contact with such surface, and maintaining the surface of said bed below said location by continuously removing particles from the bottom of said bed for flow through said process zone.

ROBERT M. SHIRK.

References Cited in the file of this patent

UNITED STATES PATENTS

| Number | Name | Date |
|---|---|---|
| 1,791,668 | Fox et al. | Feb. 10, 1931 |
| 2,412,152 | Huff | Dec. 3, 1946 |
| 2,463,623 | Huff | Mar. 8, 1949 |
| 2,487,961 | Angell | Nov. 15, 1949 |